Patented Nov. 18, 1952

2,618,637

UNITED STATES PATENT OFFICE 2,618,637

TERTIARY - AMINOALKYL DIARYLMETHYL SULFONES AND THEIR PREPARATION

Sydney Archer and Chester M. Suter, Albany, N. Y., assignors to Sterling Drug Inc., New York, N. Y., a corporation of Delaware No Drawing. Application March 18, 1950, Serial No. 150,556

32 Claims. (Cl. 260—247.1)

This invention relates to basic sulfones and to methods of preparing the same.

The basic sulfones of this invention have the formula $$RR'N—X—SO_2—CH(Ar)(Ar')$$

where RR'N is a lower aliphatic-like secondary-amino or tertiary-amino radical, X is a lower alkylene radical, and Ar and Ar' are aryl radicals. These basic sulfones are useful as pharmaceuticals, for instance because of their anti-convulsant activity.

In the above formula the lower aliphatic-like amino radical, designated as RR'N comprehends lower alkyl-amino radicals where R is hydrogen and R' is a lower alkyl group preferably having 1–6 carbon atoms such as methyl, ethyl, n-propyl, isobutyl, 2-amyl, n-hexyl, and the like. RR'N also comprehends lower dialkylamino radicals where R and R' are lower alkyl groups preferably having 1–6 carbon atoms, alike or different, such dialkylamino radicals including dimethylamino, diethylamino, di-n-butylamino, ethylmethyl-amino, diisopropylamino, di-n-hexylamino, and the like. Further, the lower aliphatic-like amino radical designated as RR'N encompasses those tertiary-amino radicals where R and R', when both are lower alkyl, are joined to form with the N atom a saturated N-heteromonocyclic amino radical having 5–6 ring atoms and where any further hetero atom besides the basic nitrogen atom is limited to an oxygen atom. Such heteromonocyclic amino radicals are illustrated by examples such as 1-piperidyl, 2-methyl-1-piperidyl, 3-ethyl-1-piperidyl, 4-methyl-1-piperidyl, 2,6-dimethyl-1-piperidyl, 1-pyrrolidyl, 2-methyl-1-pyrrolidyl, 2,5-dimethyl-1-pyrrolidyl, 4-morpholinyl, and the like. In other words, RR'NH designates a lower aliphatic-like primary or secondary amine as illustrated by n-propylamine, 2-butylamine, diethylamine, di-n-butylamine, morpholine, 4-methylpiperidine, 2,5-dimethylpyrrolidine, and the like. The lower alkylene radical, designated as X, preferably contains 2–6 carbon atoms and includes such examples as

—CH$_2$CH$_2$—, —CH$_2$CH$_2$CH$_2$—,

—CH$_2$CH$_2$CH$_2$CH$_2$—

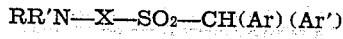

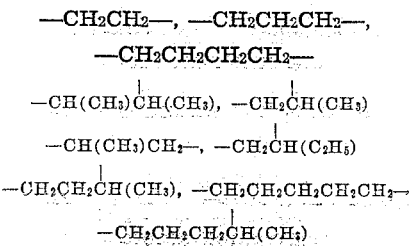

and the like. Ar and Ar', which can be the same or different, are each aryl radicals of preferably 6–10 ring-carbon atoms. The aryl radicals can be substituted by such groups as hydroxy; alkoxyl such as methoxyl, ethoxyl, etc.; dialkylamino such as dimethylamino; halogen such as chloro, bromo, or iodo; and lower alkyl such as methyl, ethyl, butyl, etc.; and other groups which the chemist appreciates will be unaffected by the reaction conditions used in the preparation of the basic sulfones of our invention. Moreover, Ar and Ar' can be linked in ortho positions, either directly to form the fluorene ring, or through such atoms as carbon, oxygen, sulfur, or nitrogen to form respectively the rings of 9,10-dihydroanthracene, xanthene, thioxanthene, or acridan. The preferred embodiments for Ar and Ar' are monocarbocyclic radicals having six ring-carbon atoms which, in other words, are aryl radicals of the benzene series including phenyl and substituted-phenyl.

In the preparation of basic sulfones of our invention, we have found the method illustrated by the following series of equations (I–III) to be useful:

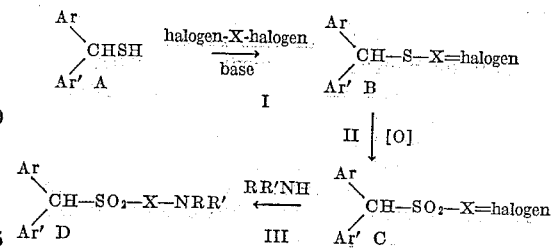

where Ar, Ar', X and RR'N have the meanings hereinabove designated. In Step I a diarylmethanethiol, A, is treated with a dihaloalkane preferably of the type where the halo groups are different such as in the compound of the formula Br—X—Cl to yield the sulfide, B, which, in turn, is oxidized in Step II to the corresponding sulfone, C. The sulfone, C, is then treated with an aliphatic-like primary or secondary amine of the formula RR'NH, to yield the basic sulfone, D. Illustrative of this series of reactions is the preparation of benzohydryl 3-(1-piperidyl)propyl sulfone by reacting benzohydryl mercaptan with trimethylene chlorobromide to form benzohydryl 3-chloropropyl sulfide, which is oxidized to the corresponding sulfone, which, in turn, is treated with piperidine.

Examples of the type of mercaptan designated hereinabove as a diarylmethanethiol and represented by A, are known. For example, diphenylmethanethiol, or benzohydryl mercaptan, was prepared by Staudinger and Stewart (Ber. 49, 1918 (1916)) by the action of hydrogen sulfide on diphenyldiazomethane. We have found that this thiol can be prepared by a more convenient method which involves treating benzohydryl chloride with thiourea to form the corresponding thiouronium chloride which, in turn, is readily hydrolyzed to diphenylmethanethiol. We have found that the thiouronium salt can be isolated in a pure state, but we prefer to hydrolyze the crude salt directly according to the usual method ("Organic Synthesis," 21, 36 (1941)). In this way we are able to obtain a fairly constant boiling, pale blue oil which according to iodometric assay is benzohydryl mercaptan of about 85% purity. The contaminants are probably some thiobenzophenone and diphenylmethane, the latter possibly being formed by disproportionation during the hydrolysis. By the same method of analysis the undistilled thiol is shown to be about 75% pure. The compound in either state of purity is suitable as an intermediate in carrying out our invention. Similarly, using other diarylmethyl halides we are able to obtain the corresponding mercaptans which are suitable for further use even in impure form (see Step I above); for example, using 9-chlorofluorene, 9-fluorenethiol is obtained.

In Step II above, the oxidation of the sulfide, B, to the corresponding sulfone, C, is readily accomplished by using oxidizing agents well suited for this purpose, such as hydrogen peroxide, chromic anhydride (CrO₃), potassium permanganate, etc. (see "Organic Chemistry of Sulfur" by Suter, John Wiley & Sons, Inc., Chapman & Hall, Ltd., London, 1944, pp. 660–67).

Another means of preparing our basic sulfones is afforded by substituting for the dihaloalkane in Step I an alkamine halide of the formula RR'N—X-halide, where RR'N and X have the meanings hereinbefore described, and thereby obtaining a basic sulfide of the formula

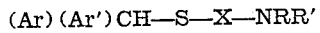
(Ar)(Ar')CH—S—X—NRR' which is readily oxidized to yield the basic sulfone, D. Illustrative of this method is the alkylation of benzohydryl mercaptan with 2-diethylaminoethyl chloride to yield benzohydryl 2-diethylaminoethyl sulfide which is oxidized to benzohydryl 2-diethylaminoethyl sulfone.

Our diarylmethyl aminoalkyl sulfones are therapeutically active whether employed as the free bases, or as their acid addition salts with relatively non-toxic organic or inorganic acids. We found it convenient to isolate the basic esters as their hydrochlorides. However other acid addition salts are within the scope of our invention. Such salts include the hydrobromides, sulfates, phosphates, citrates, sulfamates, tartrates, succinates, acetates, benzoates, oleates, and other like salts prepared from acids affording relatively non-toxic anions.

The following examples will further illustrate specific embodiments of the invention.

Example 1

A. *Diphenylmethanethiol.*—A solution of 254 g. of benzohydryl chloride, and 97.5 g. of thiourea in 510 ml. of ethanol was refluxed for two hours. A solution of 76 g. of sodium hydroxide in 600 ml. of water was then added and refluxing continued for two hours more during which time a pink oil separated. The mixture was cooled and the supernatant aqueous layer decanted. The aqueous solution was treated with dilute sulfuric acid (10 ml. of concentrated acid in 100 ml. of water) and extracted with ether. The ether extract was combined with the pink oil, and the resulting solution was dried and distilled to give 209 g. of a pale blue liquid boiling mainly at 135° C. at 1.5 mm. and mainly comprising diphenylmethanethiol (benzohydryl mercaptan).

The above procedure was also carried out using benzene instead of ether for the extraction. The oil that remained after removal of the benzene by distillation was about 75% diphenylmethanethiol according to iodimetric assay. A portion was distilled and the fraction distilling at 122–5° C. at 0.8 mm. analyzed for diphenylmethanethiol of about 83% purity. Either the distilled or undistilled product was satisfactory for further use as described below (see Example 1–B).

The above procedure also can be carried out substituting an equivalent amount of benzohydryl bromide for the corresponding chloride.

The isothiouronium salt was obtained when a solution of 365 g. of benzohydryl chloride and 137 g. of thiourea in 710 ml. of ethanol was refluxed for two hours and then cooled. About 440 g. (88%) of a white crystalline solid, benzohydryl-isothiouronium chloride, which after crystallization from ethanol melted at 196° C., was obtained.

B. *Benzohydryl 3-chloropropyl sulfone.*—Forty grams of crude diphenylmethanethiol was added to a cold solution of 4.6 g. of sodium in 100 ml. of absolute ethanol. This solution, cooled to 5° C., was added dropwise with stirring to 31.4 g. of trimethylene chlorobromide cooled to 0° C. An exothermic reaction occurred which resulted in a temperature rise to 50° C. After stirring for thirty minutes, the mixture was poured onto a mixture of ice and water. The sulfide was taken up in toluene and the latter removed by distilling in vacuo at 70° C. The sulfide was dissolved in 100 ml. of acetic acid and oxidized at 80° C. by adding 90 ml. of 30% hydrogen peroxide. After stirring for one hour the mixture was diluted with ice water, the sulfone filtered, and then recrystallized from ethanol. The resulting product, benzohydryl 3-chloropropyl sulfone, weighed 37.7 g. and melted at 112–113° C.

C. *Benzohydryl 3-(1-piperidyl)propyl sulfone hydrochloride.*—A mixture of 32.2 g. of benzohydryl 3-chloropropyl sulfone, 60 ml. of ethanol and 27 g. of piperidine was refluxed overnight. The alcohol was removed by distilling in vacuo and the residue warmed with dilute hydrochloric acid. The mixture was filtered and the filtrate made basic. The oil that separated solidified on being triturated. It was crystallized twice from ethanol to yield 19 g. of the desired product, benzohydryl 3-(1-piperidyl)propyl sulfone, M. P. 119–120° C. A sample of this basic sulfone was dissolved in ethanol and to the resulting ethanolic solution was added a solution of dry hydrogen chloride in ethanol followed by dry ether. The salt that precipitated was filtered and was recrystallized from absolute ethanol, yielding benzohydryl 3-(1-piperidyl)propyl sulfone hydrochloride, M. P. 214.4–216.2° C. (corr.).

When benzohydryl 2-chloroethyl sulfone (see Example 2A) was substituted for benzohydryl 3-chloropropyl sulfone in the above procedure, the resulting product was benzohydryl 2-(1-piperidyl)ethyl sulfone, M. P. 119.4–121.4° C. (corr.).

Example 2

A. *Benzohydryl 2 - chloroethyl sulfone.*—This compound was prepared according to the procedure described in Example 1B except that 29 g. of ethylene chlorobromide was used instead of 31.4 g. of trimethylene chlorobromide. After oxidation of the crude sulfide with 30% hydrogen peroxide in the heretofore described manner there was obtained 31.2 g. of benzohydryl 2-chloroethyl sulfone, M. P. 109–110° C.

When, in the foregoing procedure, diphenylmethanethiol is replaced by bis(4-dimethylaminophenyl)methanethiol, the resulting product is bis(4 - dimethylaminophenyl) methyl 2 - chloroethyl sulfone.

B. *Benzohydryl 2 - dimethylaminoethyl sulfone.*—A solution of 30 g. of benzohydryl 2-chloroethyl sulfone in 150 ml. of absolute ethanol was treated dropwise with 115 ml. of 1.73 N dimethylamine in absolute ethanol. A mildly exothermic reaction occurred and the mixture was allowed to stand for two hours. The solution was poured into water and the solid collected and crystallized from dilute ethanol. This crystallized product, benzohydryl 2-dimethylaminoethyl sulfone, weighed 27.8 g. and melted at 114.8–115.8° C. (corr.).

When in the above procedure there are used in place of dimethylamine other lower aliphatic secondary-amines such as di-n-butylamine, piperidine, 2-methylpiperidine, and the like, there are obtained the following respective basic sulfones: benzohydryl 2-(di-n-butylamino)ethyl sulfone; benzohydryl 2-(1-piperidyl)ethyl sulfone; benzohydryl 2-(2-methyl-1-piperidyl)ethyl sulfone; and the like. When, in the foregoing procedure, benzohydryl 2-chloroethyl sulfone is replaced by bis(4-dimethylaminophenyl)methyl 2-chloroethyl sulfone, the resulting basic sulfone is bis(4-dimethylaminophenyl)methyl 2-dimethylaminoethyl sulfone.

In the following preparation benzohydryl 2-dimethylaminoethyl sulfone was isolated in the form of its hydrochloric acid-addition salt: A solution of 67.9 g. of benzohydryl 2-chloroethyl sulfone, 138 ml. of 5 N absolute solution of dimethylamine and 300 ml. of absolute ethanol was refluxed for eight hours in a one liter flask equipped with an ice-water cooled condenser; and the reaction mixture poured onto ice. The resulting white solid was filtered, washed well with water and dissolved in 10% aqueous hydrochloric acid. The faintly cloudy solution was filtered through a layer of a filter aid, the water of the filtrate was removed by distilling under reduced pressure, and the resulting residue was dried azeotropically with benzene. This residue was dissolved in absolute ethanol and the solution was refluxed with decolorizing charcoal, filtered, and the filtrate treated with ether. The white crystalline solid, benzohydryl 2-dimethylaminoethyl sulfone hydrochloride, weighed 65 g. after drying at 0.1 mm. for four hours, M. P. 194.0–196.2° C. (corr.).

*Example 3*

A. *9-fluorenethiol.*—A solution of 52 g. of 9-chlorofluorene and 21.2 g. of thiourea in 150 ml. of ethanol was refluxed for two hours. Then 180 ml. of 10% sodium hydroxide solution was added and boiling was continued for ninety minutes. A solution of 14 ml. of sulfuric acid in 100 ml. of water was added to the mixture, and the solid that separated on cooling was filtered and recrystallized twice from methanol containing a small quantity of acetic acid. The resulting 9-fluorenethiol, which separated as shining white plates, melted at 105–106° C.

B. *9-fluorenyl 3-chloropropyl sulfone.*—This haloalkyl sulfone results when the procedure described hereinabove in Example 1B is followed using 9-fluorenethiol in place of diphenylmethanethiol.

C. *9-fluorenyl 3-(1-piperidyl)propyl sulfone.*—When the procedure described in Example 1C is followed substituting 9-fluorenyl 3-chloropropyl sulfone for benzohydryl 3-chloropropyl sulfone, the resulting product is 9-fluorenyl 3-(1-piperidyl)propyl sulfone.

*Example 4*

*Benzohydryl 2-(4-morpholinyl)ethyl sulfone.*—This basic sulfone, M. P. 128.4–129.6° C. (corr.), recrystallized from ethanol, was obtained in a yield of 21.5 g. from 29.5 g. of benzohydryl 2-chloroethyl sulfone and 18 g. of morpholine when the procedure described hereinabove in Example 1C or 2B was followed.

*Example 5*

*Benzohydryl 3-(4-morpholinyl)propyl sulfone hydrochloride.*—When the procedure described hereinabove in Example 2B was followed, using 30.9 g. of benzohydryl 3-chloropropyl sulfone and 20.0 g. of morpholine, there was obtained 15.7 g. of benzohydryl 3-(4-morpholinyl)propyl sulfone hydrochloride, M. P. 181.5–182.8° C. (corr.), recrystallized from absolute ethanol-ether.

*Example 6*

*Benzohydryl 2-(1-pyrrolidyl)ethyl sulfone.*—When the procedure described hereinabove in Example 1C or 2B was followed, using 29.5 g. of benzohydryl 2-chloroethyl sulfone and 16.0 g. of pyrrolidine, there was obtained 17.5 g. of benzohydryl 2-(1-pyrrolidyl)ethyl sulfone, M. P. 106.6–108.2° C. (corr.), recrystallized from ethanol-water.

*Example 7*

*Benzohydryl 3-(1-pyrrolidyl)propyl sulfone hydrochloride.*—When the procedure described hereinabove in Example 2B was followed, using 30.9 g. of benzohydryl 3-chloropropyl sulfone and 17.7 g. of pyrrolidine, there was obtained 11.4 g. of benzohydryl 3-(1-pyrrolidyl)propyl sulfone hydrochloride, M. P. 219.5–220.6° C. (corr.), recrystallized from absolute ethanol-ether.

*Example 8*

*Benzohydryl 2-diethylaminoethyl sulfone hydrochloride.*—When the procedure described hereinabove in Example 2B was followed, using 44.2 g. of benzohydryl 2-chloroethyl sulfone and 27.4 g. of diethylamine, there was obtained 38.0 g. of benzohydryl 2-diethylaminoethyl sulfone hydrochloride, M. P. 170.3–171.9° C. (corr.) (sinters at 138° C.), recrystallized from absolute ethanol-ether. The corresponding free base, benzohydryl 2-diethylaminoethyl sulfone, when recrystallized from ethanol and water, melted at 57.0–58.6° C. (corr.).

*Example 9*

*Benzohydryl 3-diethylaminopropyl sulfone hydrochloride.*—When the procedure described hereinabove in Example 2B was followed, using 30.9 g. of benzohydryl 3-chloropropyl sulfone and 17.7 g. of diethylamine, there was obtained 8.0 g. of benzohydryl 3-diethylaminopropyl sulfone hydrochloride, M. P. 199.4–200.8° C. (corr.), recrystallized from absolute ethanol.

*Example 10*

*Benzohydryl 3-dimethylaminopropyl sulfone.*—When the procedure described hereinabove in Example 1C or 2B was followed, using 35.0 g. of benzohydryl 3-chloropropyl sulfone and 22.0 g. of dimethylamine, there was obtained 13.9 g. of benzohydryl 3-dimethylaminopropyl sulfone, M. P. 104.2–105.2° C. (corr.), recrystallized from 80% ethanol.

*Example 11*

*Benzohydryl 2-isopropylaminoethyl sulfone hydrochloride.*—When the procedure described hereinabove in Example 2B was followed, using 17.5 g. of benzohydryl 2-chloroethyl sulfone and 25.0 g. of isopropylamine, there was obtained 17.2 g. of benzohydryl 2-isopropylaminoethyl sulfone hydrochloride, M. P. 227–228° C. (corr.) recrystallized from dilute aqueous hydrochloric acid.

Additional specific embodiments of our invention include the following basic sulfones:

(a) Bis(4-methoxyphenyl) methyl 4-dimethylaminobutyl sulfone having the formula

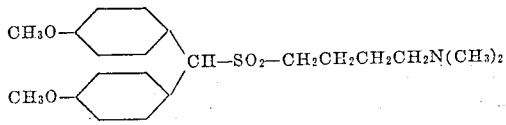

prepared by treating bis(4-methoxyphenyl)-methanethiol with tetramethylene chlorobromide to form bis(4-methoxyphenyl) methyl 4-chlorobutyl sulfide; oxidizing said sulfide to the corresponding sulfone; and treating the sulfone with dimethylamine.

(b) (3 - ethoxyphenyl) phenylmethyl 2 - di-n-butylaminoethyl sulfone having the formula

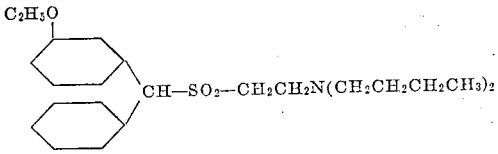

prepared by treating (3-ethoxyphenyl) phenylmethanethiol with ethylene chlorobromide to form (3-ethoxyphenyl) phenylmethyl 2-chloroethyl sulfide; oxidizing said sulfide to the corresponding sulfone; and treating the sulfone with di-n-butylamine.

(c) (4-chlorophenyl) phenylmethyl 2-(2,5-dimethyl-1-pyrrolidyl) ethyl sulfone having the formula

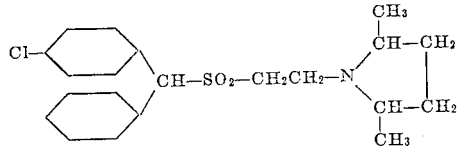

prepared by treating (4-chlorophenyl) phenylmethanethiol with ethylene chlorobromide to form (4-chlorophenyl) phenylmethyl 2-chloroethyl sulfide; oxidizing said sulfide to the corresponding sulfone; and treating the sulfone with 2,5-dimethylpyrrolidine.

(d) Bis(3,4 - diethoxyphenyl) methyl 3 - di-methylamino-2-propyl sulfone having the formula

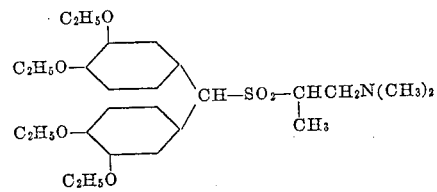

prepared by treating bis(3,4-diethoxyphenyl)-methanethiol with 3-di-methylamino-2-propyl chloride to form bis(3,4-diethoxyphenyl) methyl 3-dimethylamino-2-propyl sulfide and oxidizing said sulfide.

(e) Bis(para-tolyl) methyl 3-(3-ethyl-1-piperidyl) propyl sulfone having the formula

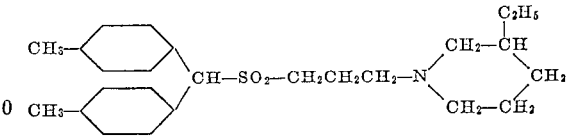

prepared by treating bis(para-tolyl) methanethiol with trimethylene chlorobromide to form bis(para-tolyl) methyl 3-chloropropyl sulfide; oxidizing said sulfide to the corresponding sulfone; and treating the sulfone with 3-ethylpiperidine.

This application is a continuation-in-part of the co-pending application, Serial Number 27,826, filed May 18, 1948 by Sydney Archer, Chester M. Suter and Benjamin F. Tullar.

We claim:

1. A member of the group consisting of a basic sulfone having the formula

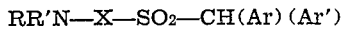

RR'N is a member of the group consisting of lower alkylamino, lower dialkylamino, 1-piperidyl, (lower alkylated)-1-piperidyl, 1-pyrrolidyl, (lower alkylated)-1-pyrrolidyl and 4-morpholinyl, X is a lower alkylene radical, and Ar and Ar' are aryl radicals whose rings are selected from the group consisting of the benzene ring and naphthalene ring, and acid addition salts thereof.

2. A sulfone having the formula

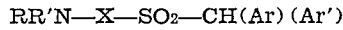

where NRR' is a 1-pyrrolidyl radical, X is a lower alkylene radical, and Ar and Ar' are monocarbocyclic aryl radicals having 6 ring-carbon atoms.

3. A sulfone having the formula

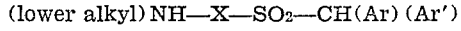

where X is a lower alkylene radical, and Ar and Ar' are monocarbocyclic aryl radicals having 6 ring-carbon atoms.

4. A sulfone having the formula

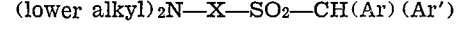

where X is a lower alkylene radical, and Ar and Ar' are monocarbocyclic aryl radicals having 6 ring-carbon atoms.

5. A sulfone having the formula

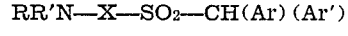

where RR'N is a 4-morpholinyl radical, X is a lower alkylene radical, and Ar and Ar' are each monocarbocyclic aryl radicals having 6 ring-carbon atoms.

6. A sulfone having the formula

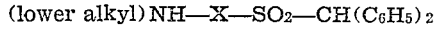

where X is a lower alkylene radical.

7. A sulfone having the formula

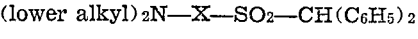

where X is a lower alkylene radical.

8. A sulfone having the formula

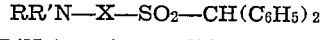

where RR'N is a 1-pyrrolidyl radical and X is a lower alkylene radical.

9. Benzohydryl 2-isopropylaminoethyl sulfone.

10. Benzohydryl 2-dimethylaminoethyl sulfone.

11. Benzohydryl 3-(4-morpholinyl) propyl sulfone.

12. Benzohydryl 3-(1-pyrrolidyl)propyl sulfone.

13. The process of preparing a basic sulfone having the formula $$RR'N-X-SO_2-CH(Ar)(Ar')$$

where RR'N is a member of the group consisting of lower alkylamino, lower dialkylamino, 1-piperidyl, (lower alkylated)-1-piperidyl, 1-pyrrolidyl, (lower alkylated)-1-pyrrolidyl and 4-morpholinyl, X is a lower alkylene radical, and Ar and Ar' are aryl radicals whose rings are selected from the group consisting of the benzene ring and naphthalene ring, which comprises reacting a sulfone of the formula, $$halogen-X-SO_2-CH(Ar)(Ar')$$

with an amine of the formula, RR'NH.

14. The process of preparing a basic sulfone having the formula $$RR'N-X-SO_2-CH(Ar)(Ar')$$

where NRR' is a 1-pyrrolidyl radical, X is a lower alkylene radical, and Ar and Ar' are monocarbocyclic aryl radicals having 6 ring-carbon atoms, which comprises reacting a sulfone of the formula, halogen-X—SO$_2$—CH(Ar)(Ar'), with pyrrolidine.

15. The process of preparing a basic sulfone having the formula $$(lower\ alkyl)NH-X-SO_2-CH(Ar)(Ar')$$

where X is a lower alkylene radical, and Ar and Ar' are monocarbocyclic aryl radicals having 6 ring-carbon atoms, which comprises reacting a sulfone of the formula, $$halogen-SO_2-CH(Ar)(Ar')$$

with an amine of the formula, (lower alkyl)NH$_2$.

16. The process of preparing a basic sulfone having the formula $$(lower\ alkyl)_2N-X-SO_2-CH(Ar)\ (Ar')$$

where X is a lower alkylene radical, and Ar and Ar' are monocarbocyclic aryl radicals having 6 ring-carbon atoms, which comprises reacting a sulfone of the formula, $$halogen-SO_2-CH(Ar)(Ar')$$

with an amine of the formula, (lower alkyl)$_2$NH.

17. The process of preparing a basic sulfone having the formula $$RR'N-X-SO_2-CH(Ar)(Ar')$$

where RR'N is a 4-morpholinyl radical, X is a lower alkylene radical, and Ar and Ar' are each monocarbocyclic aryl radicals having 6 ring-carbon atoms, which comprises reacting a sulfone of the formula, halogen-SO$_2$—CH(Ar)(Ar'), with morpholine.

18. The process of preparing a basic sulfone having the formula $$(lower\ alkyl)NH-X-SO_2-CH(C_6H_5)_2$$

where X is a lower alkylene radical, which comprises reacting a sulfone of the formula, $$halogen-X-SO_2-CH(C_6H_5)_2$$

with an amine of the formula, (lower alkyl)NH$_2$.

19. The process of preparing a basic sulfone having the formula $$(lower\ alkyl)_2N-X-SO_2-CH(C_6H_5)_2$$

where X is a lower alkylene radical, which comprises reacting a sulfone of the formula, $$halogen-X-SO_2-CH(C_6H_5)_2$$

with an amine of the formula, (lower alkyl)$_2$NH.

20. The process of preparing a basic sulfone having the formula $$RR'N-X-SO_2-CH(C_6H_5)_2$$

where RR'N is a 1-pyrrolidyl radical, X is a lower alkylene radical, which comprises reacting a sulfone of the formula, $$halogen-X-SO_2-CH(C_6H_5)_2$$

with pyrrolidine.

21. The process of preparing benzohydryl 2-isopropylaminoethyl sulfone which comprises reacting benzohydryl 2-chloroethyl sulfone with isopropylamine.

22. The process of preparing benzohydryl 2-dimethylaminoethyl sulfone which comprises reacting benzohydryl 2-chloroethyl sulfone with dimethylamine.

23. The process of preparing benzohydryl 3-(4-morpholinyl)propyl sulfone which comprises reacting benzohydryl 3-chloropropyl sulfone with morpholine.

24. The process of preparing benzohydryl 3-(1-pyrrolidyl)propyl sulfone which comprises reacting benzohydryl 3-chloropropyl sulfone with pyrrolidine.

25. A sulfone having the formula $$RR'N-X-SO_2-CH(C_6H_5)_2$$

where RR'N is a 4-morpholinyl radical and X is a lower alkylene radical.

26. The process of preparing a basic sulfone having the formula $$RR'N-X-SO_2-CH(C_6H_5)_2$$

where RR'N is a 4-morpholinyl radical and X is a lower alkylene radical, which comprises reacting a sulfone of the formula $$halogen-X-SO_2-CH(C_6H_5)_2$$

with morpholine.

27. A sulfone having the formula $$RR'N-X-SO_2-CH(Ar)(Ar')$$

where RR'N is a 1-piperidyl radical, X is a lower alkylene radical, and Ar and Ar' are each monocarbocyclic aryl radicals having 6 ring-carbon atoms.

28. A sulfone having the formula $$RR'N-X-SO_2-CH(C_6H_5)_2$$

where RR'N is a 1-piperidyl radical and X is a lower alkylene radical.

29. Benzohydryl 3-(1-piperidyl)propyl sulfone.

30. The process of preparing a basic sulfone having the formula $$RR'N-X-SO_2-CH(Ar)(Ar')$$

where RR'N is a 1-piperidyl radical, X is a lower alkylene radical, and Ar and Ar' are each monocarbocyclic aryl radicals having 6 ring-carbon atoms, which comprises reacting a sulfone of the formula, halogen-SO$_2$—CH(Ar)(Ar'), with piperidine.

31. The process of preparing a basic sulfone having the formula $$RR'N-X-SO_2-CH(C_6H_5)_2$$

where RR'N is a 1-piperidyl radical and X is a lower alkylene radical, which comprises reacting a sulfone of the formula $$halogen-X-SO_2-CH(C_6H_5)_2$$

with piperidine.

32. The process of preparing benzohydryl 3-(1-piperidyl)propyl sulfone which comprises reacting benzohydryl 3-chloropropyl sulfone with piperidine.

SYDNEY ARCHER.
CHESTER M. SUTER.

REFERENCES CITED

The following references are of record in the file of this patent:

UNITED STATES PATENTS

| Number | Name | Date |
|---|---|---|
| 2,140,608 | Ufer | Dec. 20, 1938 |
| 2,483,671 | Rievschl | Oct. 4, 1949 |